United States Patent [19]

Mourray

[11] Patent Number: 4,610,332

[45] Date of Patent: Sep. 9, 1986

[54] VELOCITY SENSITIVE VALVE ELEMENT FOR A SHOCK ABSORBER

[75] Inventor: Jack W. Mourray, West Bloomfield, Mich.

[73] Assignee: Ford Motor Company, Dearborn, Mich.

[21] Appl. No.: 764,966

[22] Filed: Aug. 12, 1985

Related U.S. Application Data

[63] Continuation of Ser. No. 318,646, Nov. 5, 1981, abandoned.

[51] Int. Cl.$^4$ .............................................. F16F 9/34
[52] U.S. Cl. ............................. 188/322.15; 137/517; 137/860; 188/280; 188/282; 267/127; 280/708
[58] Field of Search .......... 188/280, 282, 317, 322.13, 188/322.14, 322.15, 279; 280/708; 267/127; 137/517, 843, 860

[56] References Cited

U.S. PATENT DOCUMENTS

| | | | |
|---|---|---|---|
| 1,833,906 | 12/1931 | Land | 188/280 |
| 2,342,578 | 2/1944 | Giannini | 188/317 X |
| 2,674,262 | 4/1954 | Bradshaw | 137/517 |
| 2,697,496 | 12/1954 | McIntyre | 188/280 |
| 2,767,733 | 10/1956 | Anderson | 137/517 X |
| 3,074,515 | 1/1963 | MacLellan | 188/280 |
| 3,078,965 | 2/1963 | DeCarbon et al. | 188/317 |
| 3,164,225 | 1/1965 | DeCarbon | 188/320 |
| 3,199,636 | 8/1965 | DeCarbon | 188/317 |
| 3,312,312 | 4/1967 | DeCarbon | 188/317 |
| 3,378,110 | 4/1968 | Parrish, Jr. | 188/315 |
| 3,519,109 | 7/1970 | Whisler, Jr. | 188/269 |
| 3,605,801 | 9/1971 | DeCarbon | 137/513.7 |
| 3,730,305 | 5/1973 | Foots | 92/248 X |
| 3,747,714 | 7/1973 | DeCarbon | 188/317 |
| 3,756,357 | 9/1973 | Graff et al. | 188/282 |
| 3,945,474 | 3/1976 | Palmer | 188/282 X |
| 3,984,889 | 10/1976 | Blomgren | 188/280 X |
| 4,113,072 | 9/1978 | Palmer | 188/282 |
| 4,203,507 | 5/1980 | Tomita et al. | 188/317 |
| 4,262,844 | 4/1981 | Sekiya | 236/48 R |
| 4,352,417 | 10/1982 | Stinson | 188/322.15 |

FOREIGN PATENT DOCUMENTS

| | | | |
|---|---|---|---|
| 2426326 | 12/1974 | Fed. Rep. of Germany | 188/280 |
| 1137522 | 1/1957 | France | 137/517 |
| 1557059 | 1/1969 | France | 188/282 |
| 480805 | 3/1938 | United Kingdom | 188/317 |
| 691307 | 5/1953 | United Kingdom | 188/280 |

*Primary Examiner*—George E. A. Halvosa
*Attorney, Agent, or Firm*—Jerome R. Drouillard; Roger L. May

[57] ABSTRACT

A telescopic hydraulic shock absorber for a motor vehicle has a piston with a frustoconical valve element that provides a bypass passage from the rebound chamber to the jounce chamber during a low velocity rebound stroke of the piston with respect to the pressure tube. The frustoconical valve element is constructed to be sufficiently resilient to become seated and close off the bypass passage in response to a relatively high velocity rebound stroke such that all fluid is forced through the rebound ports and the rebound valve to provide higher damping than when the bypass passage is open.

2 Claims, 12 Drawing Figures

VELOCITY SENSITIVE VALVE ELEMENT FOR A SHOCK ABSORBER

This application is a continuation of application Ser. No. 318,646 filed Nov. 5, 1981, now abandoned.

BACKGROUND OF THE INVENTION

1. Field of the Invention

This invention relates generally to motor vehicle shock absorbers and more particularly to an improved valve construction for a shock absorber.

2. Disclosure Information

Telescopic shock absorbers commonly have a working cylinder with a piston assembly slideably received therein. Commonly, the cylinder is fixed to an unsprung member such as a suspension arm whereas the piston assembly is fixed to a piston rod that in turn is fixed to a sprung member such as a chassis frame. The cylinder is filled with fluid. The piston has passageways therethrough which restrict fluid flow between a chamber within the pressure tube defined below the piston and a chamber defined above the piston. The restricted fluid flow damps the motion of the piston relative to the cylinder. The passageways in the piston are often opened and closed by spring biased disc valves to give the shock absorber a high or low damping characteristic.

Usually, a double acting shock absorber has a valve element closing off the jounce ports during a rebound stroke and a second valve element closing off the rebound ports during a jounce stroke. During each jounce stroke, fluid passes through the jounce port and forces open the valve covering the jounce ports against a spring bias. In a similar manner during each rebound stroke, fluid passes through the rebound ports and forces open the second valve element against its spring bias.

Shock absorbers are desired to provide a soft ride on smooth road surfaces and yet have a capacity to dampen severe shocks when the vehicle encounters potholes and large bumps. Consequently, telescopic shock absorbers incorporated into motor vehicles are often constructed with a compromised damping characteristic.

Particular problems occur in MacPherson style suspensions which incorporate a shock absorber in a telescopic strut. If the piston valve does not provide sufficient damping, the piston can reach its stroke limit and abut either the bottom or the top end of the cylinder or a stop bumper which cause severe jarring to the vehicle. On the other hand, if the piston provides for too much damping, the piston can lock up within the cylinder and cause the shock absorber to be inoperable under certain conditions. As a result, a passenger may feel annoying small vibrations during operation of the vehicle on relatively smooth road surfaces.

Certain telescopic shock absorbers allow for low damping characteristics when the piston is centrally located in the pressure tube and produce higher damping forces when the piston is near either end of the pressure tube. However, the damping characteristics are dependent on the position of the piston. When a large pothole or bump is encountered, it is desirable for the piston to have a large damping force before it reaches the extremity of its stroke.

What is needed is a piston valve that normally provides low amount of damping but provides high damping control when needed independent from the position of the piston in the pressure tube.

SUMMARY OF THE DISCLOSURE

In accordance with the invention, a direct acting hydraulic shock absorber has a piston assembly that reciprocates within a pressure tube. The piston assembly includes a piston having a series of rebound ports and a series of compression ports. The piston also has integral valve seats radially spaced from each other with the compression ports interposed therebetween.

A frustoconical valve element is positioned about the piston rod. The valve element is normally seated on the radially outward valve seat and is normally spaced from the radially inward valve seat to form a gap therebetween. The rebound ports are normally closed by a rebound valve disc that is biased to the closed position by a coil spring.

The frustoconical valve element is constructed to be sufficiently rigid to maintain the gap formed between its radially inner portion and the radially inner valve seat when the piston is undergoing a low velocity rebound stroke. The gap allows fluid to pass therethrough and through the compression ports.

The frustoconical valve disc is constructed to be sufficiently flexible to flatten out and become seated on the radially inner valve seat when the piston is undergoing a high velocity rebound stroke. When the valve element flattens out, the compression ports are closed and fluid is forced through the rebound ports. The fluid pressure in the rebound ports opens the rebound valve disc.

In an alternate embodiment, it is desired to interpose a flat restricting valve plate between the compression port valve seats and the frustoconical valve element. The restricting valve plate has restricting apertures therethrough which are in fluid communication with the compression ports. In this embodiment, the frustoconical valve element is seated on a radially outer portion of the flat restricting valve plate.

In accordance with the broader aspects of the invention, a shock absorber for a motor vehicle has a pressure tube with a piston received therein for reciprocal movement. The piston is in sliding engagement with the pressure tube to provide first and second chambers within the pressure tube. The piston has a fluid restricting passage in communication with the first and second chambers for restricting the fluid flow between the chambers. The piston also has a less restrictive bypass passage in communication with the chambers. A check valve is constructed to check the flow through the bypass passage only when the piston moves faster than a predetermined speed in a first direction. Fluid is forced to flow through the fluid restricting passage only when the check valve is closed.

BRIEF DESCRIPTION OF THE DRAWINGS

Reference now will be made to the accompanying drawings in which.

DETAILED DESCRIPTION OF THE PREFERRED EMBODIMENTS

Figure 1:
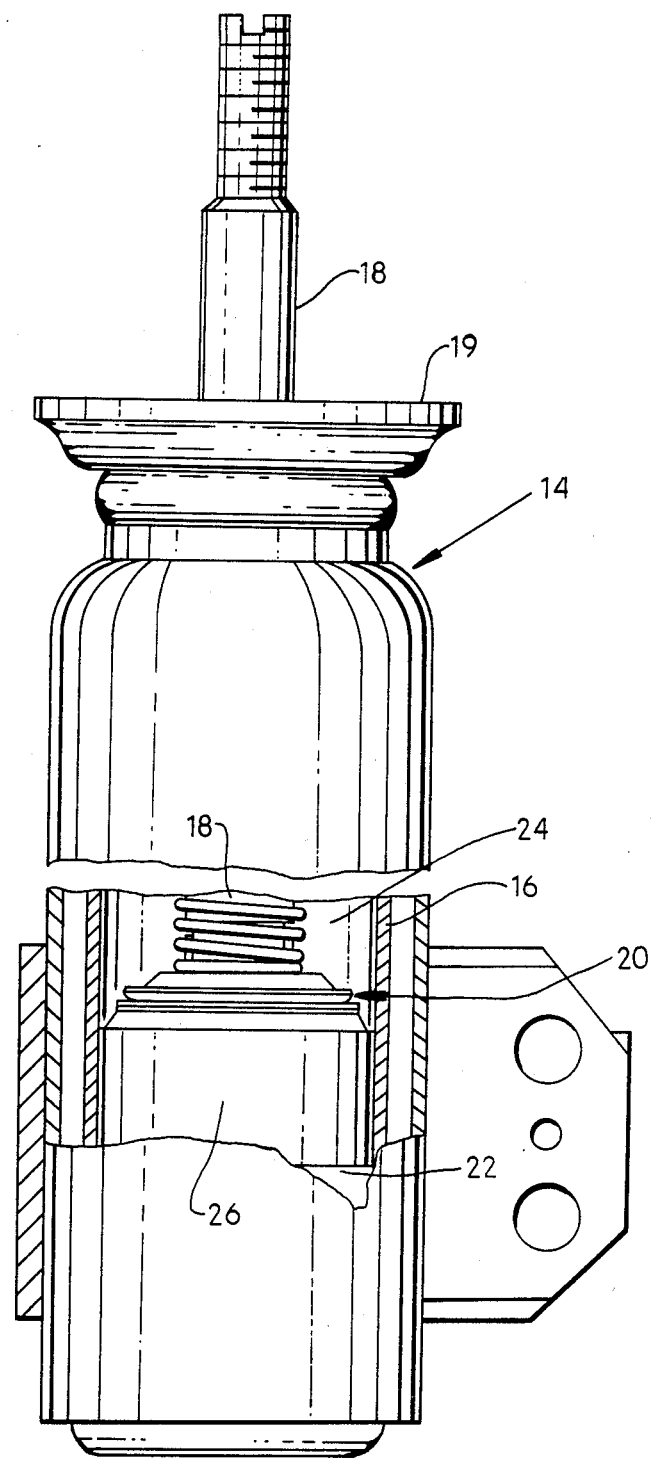
FIG. 1 is a fragmented and partially segmented side elevational view of a telescopic shock absorbing strut incorporating an embodiment of the invention.

Referring now to FIG. 1, a telescopic shock absorbing strut 14 has a pressure tube 16 secured thereto. A piston assembly 20 is slideably received within pressure tube 16. A piston rod 18 has one end connected to the piston assembly 20 and extends upwardly through the top end cap 19 of the strut 14.

The piston assembly 20 divides the interior of the pressure tube 16 into jounce and rebound pressure chambers 22 and 24. The jounce chamber 22 is situated at the lower end of the strut below piston assembly 20. The rebound chamber 24 has an annular shape and is situated between the piston assembly 20 and the upper end of the pressure tube 16.

Figure 2:
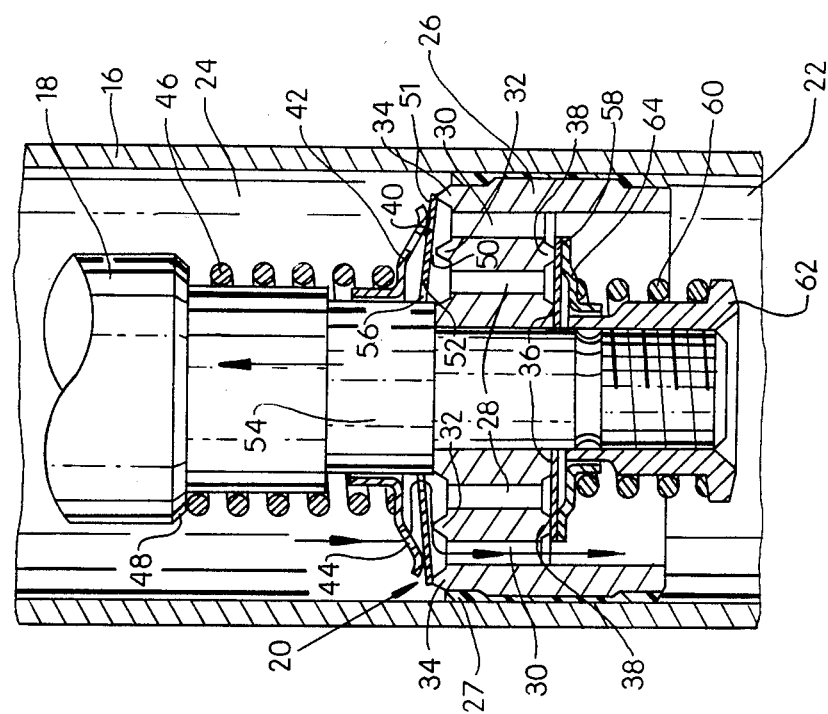
FIG. 2 is a partially segmented and fragmentary view detailing the piston assembly shown in FIG. 1 during a low velocity rebound stroke.

The piston assembly 20 is viewed in greater detail in FIG. 2. The piston assembly 20 includes a piston 26 having a low friction outer ring 27 secured thereto and in sliding engagement with the pressure tube 16. The piston has a series of rebound ports 28 and a series of jounce ports 30. Annular valve seats 32 and 34 are provided on the upper surface of the piston 26 and are situated radially inwardly and outwardly, respectively, relative to the jounce ports 30. The piston 26 is also provided with depending annular valve seats 36 and 38 that are spaced radially inwardly and outwardly relative to the rebound ports 28.

Figure 5:
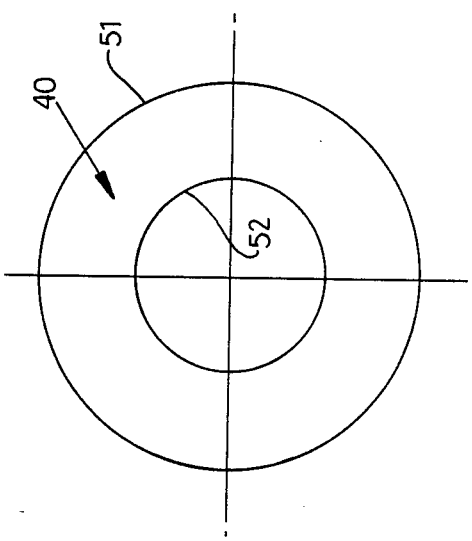
FIG. 5 is a plan view of the frustoconical valve element shown in FIG. 2.
Figure 6:
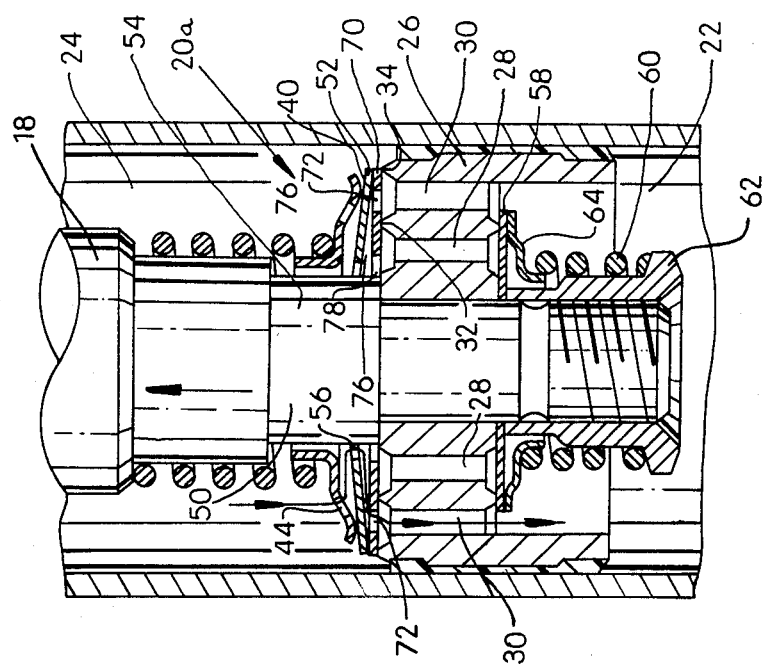
FIG. 6 is a view similar to FIG. 2 showing a second embodiment of a piston assembly during a low velocity rebound stroke.

A frustoconical shaped valve element 40 is pressed into sealing engagement with the outer annular valve seat 34 by spring 46 and spring seat 42. As shown in FIG. 5, the frustoconical valve element 40 is annular in shape in the plan view with an outer diameter edge 51 and an inner diameter edge 52. Referring back to FIG. 2, the spring seat 42 is urged against the valve element 40 by a coil spring 46 interposed between the spring seat 42 and the shoulder 48 of piston rod 18. The spring seat 42 abuts the valve element 40 radially outward from the contact area between inner seat 32 and valve element 40.

The inner diameter edge 52 of valve element 40 is normally positioned higher than the outer diameter edge 51. Consequently, the valve element 40 is normally unseated from inner valve seat 32 to form a gap 50 therebetween. In addition, the inner edge 52 has a diameter greater than the diameter of end section 54 of piston rod 18 to provide an annular gap 56 therebetween. The spring seat 42 has apertures 44 therethrough in fluid communication with gap 56.

The bottom portion of piston 26 has a disc shaped valve element 58 seated against valve seats 36 and 38. The valve element 58 is biased to the seated position by a coil spring 60 that is interposed between a flanged nut 62 and a spring seat 64. The nut 62 is threaded on the reduced diameter end portion of the piston rod 18 and serves to hold the several components of the piston assembly 20 in their appropriate relative position.

OPERATION

When the piston assembly is stationary, the piston assembly appears as shown in FIG. 2. The valve element 58 is seated on the piston 26 and closes off rebound ports 28. The frustoconical valve element 40 is seated only on outer seat 34 and forms a gap 50 with respect to inner seat 32.

As shown in FIG. 2, during a low velocity rebound stroke where the piston has a low velocity with respect to the pressure tube, the pressure differential between the chambers 22 and 24 is small. The frustoconical valve element is sufficiently rigid to resist the small pressure differential to remain unseated from inner valve seat 32 and retain the gap 50. A bypass passage is formed via gap 50 and jounce ports 30 to allow fluid to pass from the rebound chamber to the jounce chamber. The bypass formed by gap 50 and jounce ports 30 is dimensioned to allow for a relatively free flow between the two chambers 22 and 24. As such, the damping characteristics of the piston assembly are low when the bypass remains open as shown in FIG. 2. The low damping characteristics of the piston allows for a softer ride on smooth roads.

Figure 3:
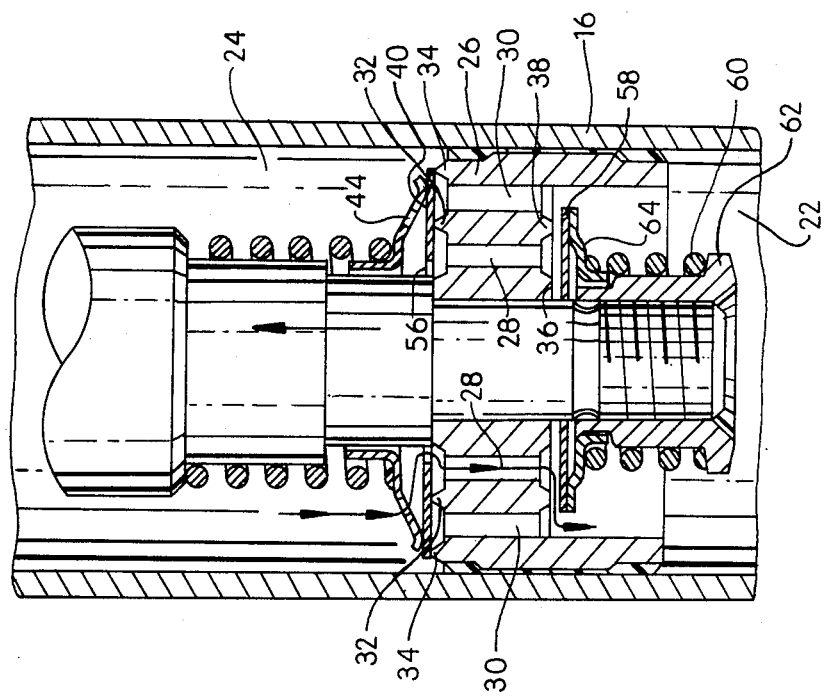
FIG. 3 is a view similar to FIG. 2 showing the piston assembly during a high velocity rebound stroke.

As shown in FIG. 3, during a high velocity rebound stroke of the piston relative to the pressure tube 16, the pressure differential between chambers 22 and 24 is large. The valve element is constructed to be sufficiently resilient to flatten out at a predetermined pressure differential between the rebound chamber 24 and jounce chamber 22. When the piston 26 is moving rapidly with respect to pressure tube 16 during the rebound stroke, the higher pressure within rebound chamber 24 flattens out the valve element 40 such that it becomes seated on the inner annular valve seat 32 and closes off the jounce ports 30 and interrupts the bypass formed by gap 50 and jounce ports 30. The fluid flow is then directed through rebound ports 28 via the apertures 44 in spring seat 42 and gap 56.

The fluid pressure, during a high velocity rebound stroke, opens valve element 58 against the spring bias of coil spring 60 to allow the fluid to flow from the rebound chamber 24 to the jounce chamber 22. The rebound ports 28 are sized and the coil spring 60 is constructed to cause the fluid flow through rebound ports 28 to be restricted relative to the fluid flow described above when the gap 56 is open. The piston assembly 20, therefore, obtains a greater damping characteristic to provide greater control when such control is needed (e.g., during a high velocity rebound stroke).

Figure 4:
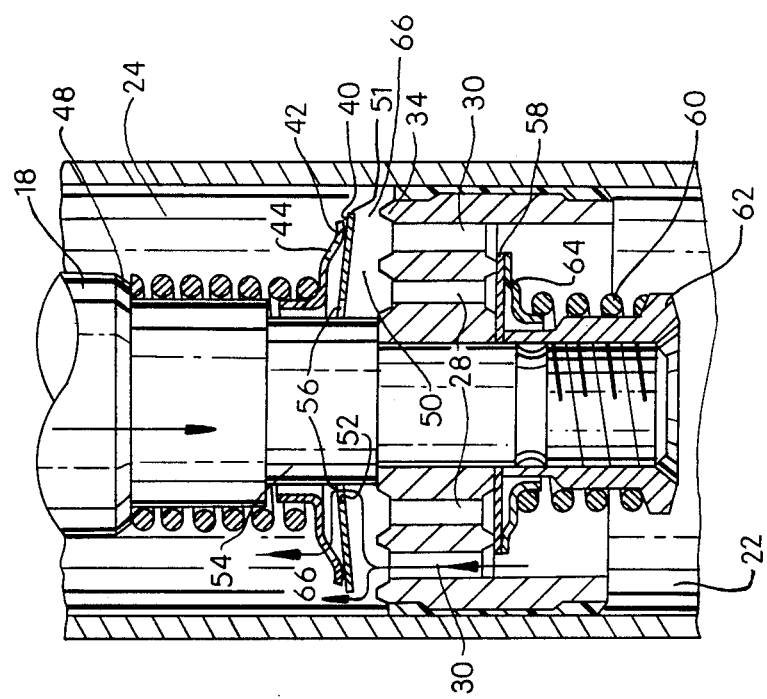
FIG. 4 is a view similar to FIG. 2 showing the piston assembly during a jounce stroke.

During a compression stroke, as shown in FIG. 4, fluid flows from the jounce chamber 22 to the rebound chamber 24 via jounce ports 30 which cause the frustoconical valve element 40 to lift from the outer seat 34 against the bias of coil spring 46. The fluid flows between the enlarged gap 50 and a newly formed gap 66 formed between the annular seat 34 and valve element 40.

Figure 10:
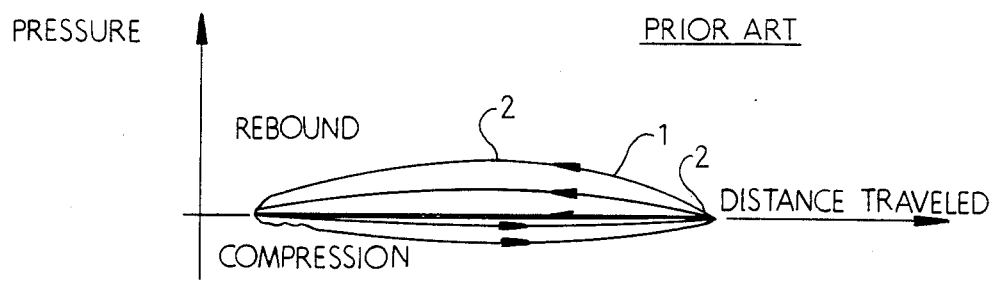
FIG. 10 is a graph illustrating the relationship of fluid pressure to travel of a conventional double acting piston.
Figure 11:
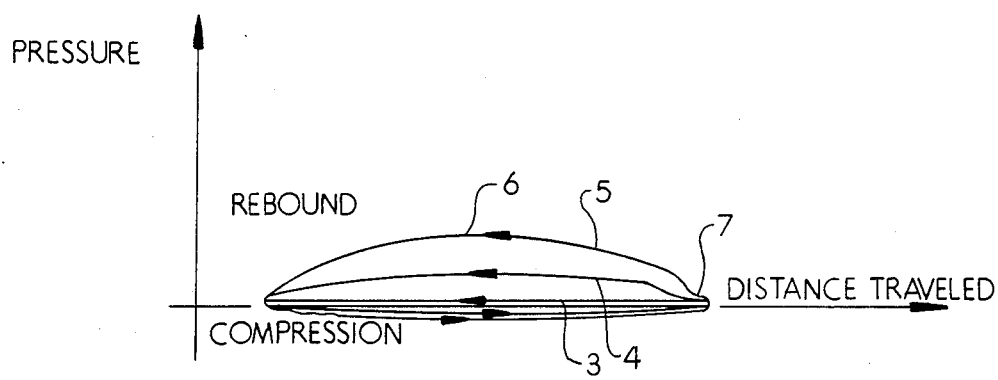
FIG. 11 is a graph similar to FIG. 10 for the piston assembly shown in FIGS. 1 through 4.

FIGS. 10 and 11 are graphs which compare a conventional double acting piston assembly to the piston assembly 20 during compression and rebound strokes of varying velocities. The prior art piston assembly is constructed such that during a high velocity stroke shown by curve 1, the slope at the beginning of the rebound travel is steep. Consequently, jarring of the motor vehicle occurs. to prevent overly harsh jarring at the beginning of the rebound stroke, the piston assembly maximum damping properties are compromised with the maximum damping occurring at point 2 of the curve. However, the compromised maximum damping is often insufficient to prevent the strut from becoming fully extended. Therefore, the motor vehicle may be jarred when the piston assembly abuts a conventional rebound stop.

In contrast, FIG. 11 shows the graph of piston assembly 20 by strokes of varying initial speeds. During low velocity rebound stroke shown by curves 3 and 4, the slope of the curve is near horizontal which means that there is little damping by the piston. However, during the high velocity rebound strokes as illustrated by curve 5, the slope of the curve is at first near horizontal as indicated at 7 which initially provides little damping. This near horizontal slope occurs because the valve element 40 has not yet flattened out to close off jounce ports 30. However, when the valve 40 closes off ports 30, the piston assembly 20 provides high damping with the maximum indicated at point 6. The piston assembly 20 thus provides for a little damping during low velocity strokes and during the initial portion of a high velocity stroke but provides greater damping during the remainder of a high velocity stroke. The amount or degree of damping, however, is velocity responsive rather than position responsive.

SECOND EMBODIMENT

Figure 7:
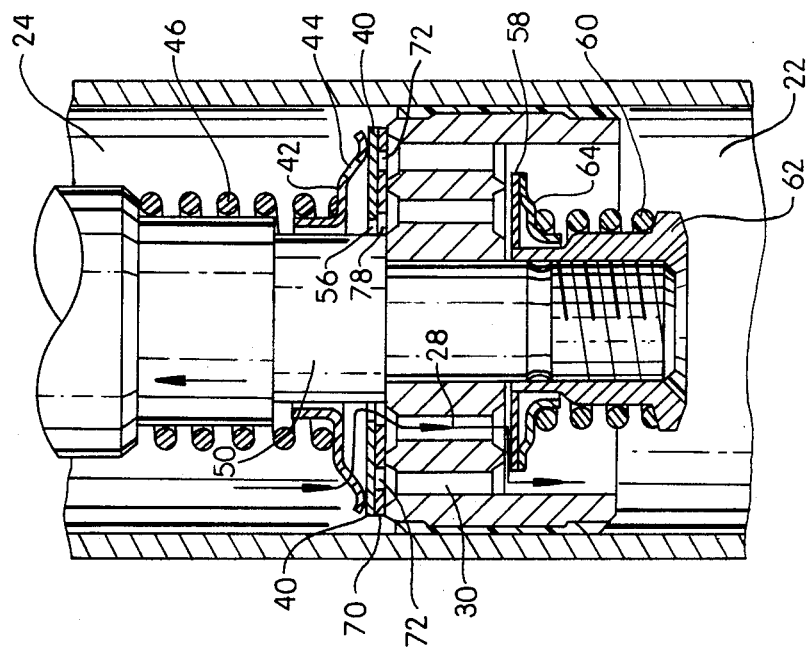
FIG. 7 is a view similar to FIG. 6 showing the second embodiment of a piston assembly during a high velocity rebound stroke.
Figure 8:
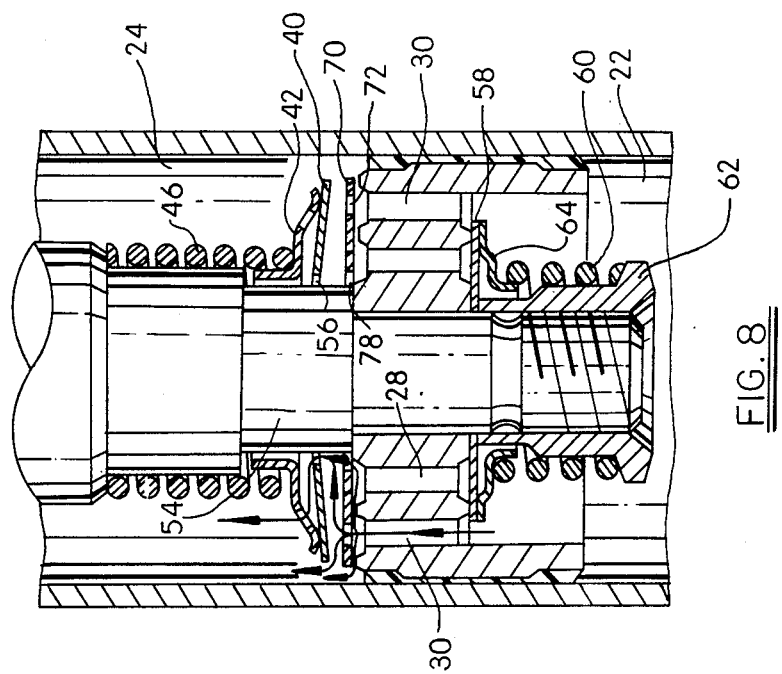
FIG. 8 is a view similar to FIG. 6 showing the second embodiment of a piston assembly during a jounce stroke.
Figure 9:
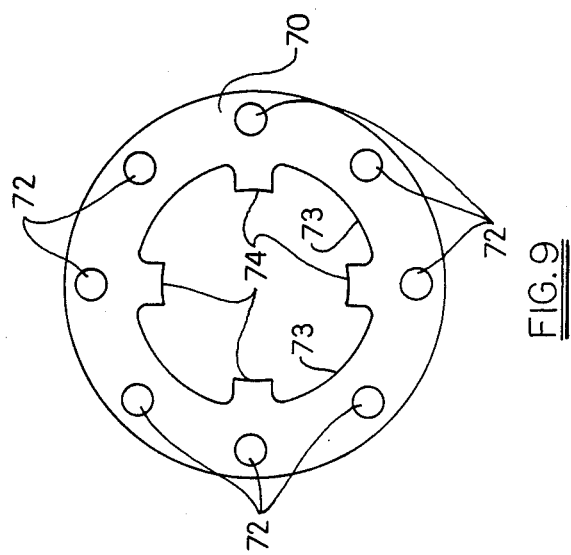
FIG. 9 is a plan view of the flat restricting valve plate shown in FIG. 6.

Referring now to FIGS. 6 through 9, a second embodiment of a piston assembly 20(a) is shown. For simplicity, parts of the second embodiment identical to parts in the first embodiment are indicated by the same numerals. In piston assembly 20a, a flat restrictor disc 70 is interposed between the frustoconical valve element 40 and the valve seats 32 and 34 of piston 26. The restrictor disc 70 is seated on both seats 32 and 34. As shown in FIG. 9, the restrictor disc 70 has a series of restricting apertures 72 therethrough. The disc 70 has a radially inner edge 73 with positioning prongs 74 radially extending inwardly such that when the ring is positioned about the end portion 54 of piston rod 18 the prongs 74 abut the rod 18 and maintain the coaxial alignment between the rod 18 and disc 70. Referring back to FIG. 6, the rest of inner edge 73 is spaced from stem portion 54 to form a gap 78 therebetween. The apertures 72 align with the jounce ports 30.

Frustoconical valve element 40 has its radially outer diameter edge 52 seated on the radially outer portion of the restrictor disc 70. The rest of the valve element 40 and restrictor disc 70 normally form a gap 76 therebetween. The gap 76 is in fluid communication with apertures 72.

In operation, during a low velocity rebound stroke, the valve element 40 will retain its frustoconical shape such that a passage is formed via apertures 44, gap 56, gap 76, aperture 72 and jounce ports 30 which allows fluid to flow from the rebound chamber 24 to the jounce chamber 22 bypassing the rebound ports 28 and disc valve 58.

As shown in FIG. 7, when the piston assembly 20(a) undergoes a rebound stroke of high velocity the valve element 40 flattens out to cover apertures 72 in restrictor disc 70, thereby closing off jounce ports 30. The fluid flow is then directed through the rebound ports via the apertures 44, gap 56, and gap 78. The fluid passing through the rebound ports 28 forces the valve disc 58 to open against the bias of coil spring 60 to allow the fluid to flow from the rebound chamber 24 to the jounce chamber 22. As in the first embodiment, the size of ports 28 and the closing force exerted by coil spring 60 cause the fluid flow through rebound ports 28 to be restricted relative to the above described fluid flow through the bypass passage.

As shown in FIG. 8, during the compression stroke, fluid flows from the jounce chamber 22 through jounce ports 30 and through openings 72 in restrictor disc 70. When the fluid pressure differential between the jounce chamber and rebound chamber becomes sufficiently great, the restrictor disc 70 lifts off seats 32 and 34 and raises the frustoconical valve element 40 to allow a greater flow between the chambers 22 and 24.

Figure 12:
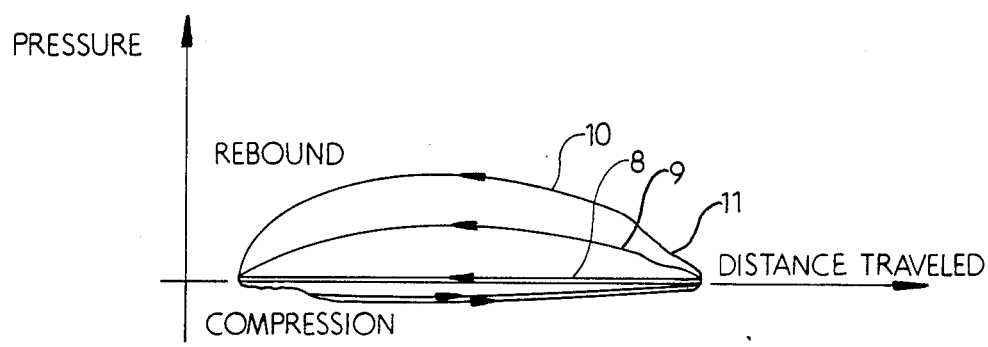
FIG. 12 is a graph similar to FIG. 10 for the piston assembly shown in FIGS. 6 through 8.

Referring to FIG. 12, during low velocity rebound strokes of the piston assembly 20(a), the damping characteristics of the piston are low to provide for a softer ride as shown by curve 8. However, during higher velocity rebound strokes as shown by curves 9 and 10, the piston obtains a greater damping force. In addition, the transition from a low damping piston configuration to a high damping piston configuration, indicated at section 11 of curve 10 and section 12 of curve 9, is smooth to minimize jarring of the motor vehicle during the transition period.

In this fashion, the shock absorber has a high damping characteristic when needed during off-road use or when large potholes or bumps are encountered by a motor vehicle without compromising desired low damping characteristics that produce softer rides on smooth roads. In addition, the damping characteristics of the piston is independent of its position within the pressure tube.

Variations and modifications of the present invention are possible without departing from its spirit and scope as defined by the appended claims.

I claim:

1. A piston for an automotive shock absorber comprising:
   a piston having a first passageway axially extending therethrough and circumscribed by a first valve seat;
   flow control means for controllably opening said first passageway when said piston and flow control means have a pressure exerted thereon in a first direction;
   a second passageway axially extending therethrough radially outboard of said first passageway and bypassing said flow control means;
   a second valve seat circumscribing said second passageway; and
   an asymmetrically responsive pressure sensitive frustoconical valve biased at its outer diameter against said second valve seat by a coil spring and spring seat and constructed to:
   (i) close said second passageway in response to a pressure above a first predetermined level exerted on said valve in said first direction by resiliently flexing into contact with said first valve seat;

(ii) remain open to a first extent to flow occurring through said second passageway when a pressure below said first predetermined level is exerted on said valve in said first direction; and (iii) axially shift in its entirety in a second direction against the force of said coil spring so that said outer diameter becomes unseated from said second valve seat so as to open to flow occurring through said second passageway to an extent greater than said first extent when pressure above a second predetermined level is exerted on said frustroconical valve.

2. A piston assembly as defined in claim 1 wherein said flow control means comprises a check valve mounted on said piston for opening said first passageway when a pressure above said first predetermined amount is exerted on said piston and said check valve in said first direction.

* * * * *